INVENTORS
JAMES J. HUMPHRIES
ABRAM L. HODGE
ROGER S. BABCOCK
BRUCE C. WHITMORE

BY *William J. Meisinger*

ATTORNEY

FIG. 6 so that the wet process involves the grinding and mixing of the raw materials in slurry form. On the other hand, the dry process involves drying and crushing the raw material and subsequently blending them in the dry state. In both processes the raw materials are then fed to a rotary kiln.

United States Patent Office 3,074,707
Patented Jan. 22, 1963

3,074,707
PROCESS FOR THE MANUFACTURE OF CEMENT
James J. Humphries, Chatham, and Abram L. Hodge, Cranford, N.J., Roger S. Babcock, Berwyn, Pa., and Bruce C. Whitmore, Downsview, Ontario, Canada, assignors to Union Carbide Corporation, a corporation of New York
Filed Apr. 15, 1960, Ser. No. 22,424
8 Claims. (Cl. 263—53)

This invention relates to the manufacture of cements or similar materials and more particularly to an improved method for burning cement-forming raw materials in a rotary kiln.

The cement making process is essentially a combustion process wherein a cement-forming raw material mixture consisting of calcareous material usually limestone ($CaCO_3$) and argillaceous materials such as clay, shale, etc., containing alumina ($Al_2O_3$), silica ($SiO_2$) and some iron oxide ($Fe_2O_3$) in the proper proportions is heated, usually by an air-fuel flame, to a temperature of about 1450° F. or above at which the limestone ($CaCO_3$) will break down into lime ($CaO$) and carbon dioxide ($CO_2$). The lime, silica, alumina and iron oxide is then further heated to a temperature in the range of from about 2400 to 2800° F. at which temperature the material will begin to liquefy and absorb a portion of the other components. This semi-liquid state agglomeration is called clinker.

Oxygen has been used in the steel industry for enriching air supplies to open hearth furnaces for many years. The results in that industry have been remarkable. In fact, today almost all steel manufacturers utilize oxygen enrichment in their steel making processes.

Although there have been indications in the prior art of early attempts to utilize oxygen in the production of cement, none of these efforts have resulted in a commercially feasible process.

One of the major drawbacks attendant to the use of oxygen was the overheating and rapid deterioration of the refractory linings in the rotary kilns. Attempts have been made to shield the refractories from the intense heat of the oxygen enriched flame but all have resulted in excessive waste of valuable heat energy.

Another drawback has been an economical one. The cement industry producing a low market value product has always had the impression that cost of installing oxygen equipment would be prohibitive relative to the selling price of cement.

Accordingly, it is an object of this invention to provide a method for making cement wherein oxygen is utilized to enrich the air-fuel flame in a rotary kiln which eliminates the above-mentioned drawbacks heretofore associated with the use of oxygen and to provide an economically feasible cement-making oxygen process.

Another object is to provide a method for making cement wherein oxygen is used to redistribute the energy available in a cement kiln.

An additional object is to provide a method of utilizing oxygen in a cement-making process which results in an increase in production and a reduction in fuel consumption and dust per barrel of product manufactured.

The foregoing objects are achieved in the process of the invention which in its broadest aspects comprises charging cement-forming raw materials at a certain feed rate to the feed end of a rotary kiln, injecting a combustible mixture into the kiln from the discharge end thereof and igniting the mixture to provide a flame in the kiln; such flame establishing within the kiln a high grade energy zone at a temperature of about at least 1450° F. wherein high grade energy is supplied to the cement-forming raw materials and also a low grade energy zone at a temperature of below at least 1450° F. wherein low grade energy is supplied to the raw materials; supplying an oxygen stream to the kiln from the discharge end and positioning such oxygen stream between the flame and the cement-forming raw material in the kiln at a point within the area, in a plane transverse to the axis of the kiln, defined by the center of the flame and the extremities of the raw material load and preferably at a point on a line drawn from the center of the flame to the center of the mass of such raw materials thereby causing an increase of energy in the high grade energy zone and a decrease of energy in the low grade energy zone without changing the total energy available, and then increasing the feed rate of the raw materials to the kiln to absorb the increase of high grade energy available such that a condition of substantial thermal balance is established in the kiln.

Other objects and features of novelty of the invention will be specifically pointed out or will become apparent when referring, for a better understanding of the invention, to the following description in conjunction with the accompanying drawings wherein.

For the purpose of describing the method of the invention the following description refers specifically to the manufacture of Portland cement by the heat process. This is not to be understood as limiting the invention in any way except as limited and defined by the appended claims.

Portland cement is made by mixing and calcining calcareous and argillaceous materials in the proper proportions. There are two main processes in current use; namely, the wet process and the dry process. The wet process involves the grinding and mixing of the raw materials in slurry form. On the other hand, the dry process involves drying and crushing the raw material and subsequently blending them in the dry state. In both processes the raw materials are then fed to a rotary kiln.

The kiln is fired at the feed discharge end through a stationary hood with air and fuel such as oil, powdered coal or gas. This end is at an intense heat of at least about 1450° F. and provides a zone wherein what is known as high grade thermal energy is supplied to the solids. As the hot gases of combustion sweep through the kiln, they are cooled by the raw material that is being dried and calcined and escape at the feed inlet end of the kiln at temperature sufficiently in excess of the dew point of the gases to prevent condensation of water vapor in associated gas cleaning equipment or in the kiln itself. Enegry which is supplied to the raw materials in this cooler zone of the kiln below the nominal minimum calcination temperature of 1480° F. is considered low grade energy. The product formed in the kiln is a hard granular mass called clinker. This clinker at a temperature in the range of from about 2400° F. to 2800° F. and usually about 2500° F. passes into a cooler which serves to preheat air entering the combustion zone. Also the heat absorbed in cooling the clinker may be utilized to power associated equipment. To make a pound of clinker about 920 B.t.u.'s of high grade energy and only about 650 B.t.u.'s of low grade energy are required. In all cement kilns the limiting factor to obtaining production is the availability of high grade energy. An examination of exit gas temperatures indicates that there is an excess of low grade energy exhausted from the kiln.

This invention is predicated on the discovery that a beneficial change in the relative availability of the two grades of energy is realized when oxygen is added to the combustion process according to the method hereinafter described.

Consider, for example, a kiln firing fuel which provides approximately 98 million B.t.u.'s of energy. In the case where no oxygen is added to the flame and a 35% moisture containing slurry is utilized as the feed there is approximately 21 million B.t.u.'s of high temperature energy available to do work, that is, to calcine and further heat the raw materials, in the high temperature zone of the kiln.

In the low temperature zone there is available about 28 million B.t.u.'s for driving water from the slurry added to the kiln as raw materials; another approximated 27 million B.t.u.'s are available to bring the raw materials up to calcining temperature and about 25 million B.t.u.'s at about 680° F. are discharged in the exhaust gas. This represents a high temperature energy utilization (H.T.E.U.) of about 21.5%, a low temperature energy utilization (L.T.E.U.) of about 31.3% and an exhaust gas loss of about 25.5% or a ratio of high temperature energy utilization to low energy utilization plus energy loss in the exhaust gas of about .378. Now assuming the same firing rate, 98 million B.t.u.'s, and the same 35% moisture-containing feed but with an oxygen addition of 6000 c.f.h., there is approximately 23 million B.t.u.'s of high temperature energy available to do work in the high temperature zone. In the lower temperature zone there is available about 30 million B.t.u.'s for driving water from the slurry. Another approximately 28 million B.t.u.'s are available to bring the raw materials up to calcining temperature but only about 20 million B.t.u.'s at about 560° F. are discharged in the exhaust gas. This represents a H.T.E.U. of about 23.5%, at L.T.E.U. of about 34.4% and an exhaust gas loss of about 20.4% or a ratio of H.T.E.U./L.T.E.U. plus energy loss in exhaust gas or about .430. This last named ratio clearly indicates that when oxygen is added to the flame, a shift in energy takes place from the low temperature zone to the high temperature zone, where such energy will serve to increase production.

Figure 6:
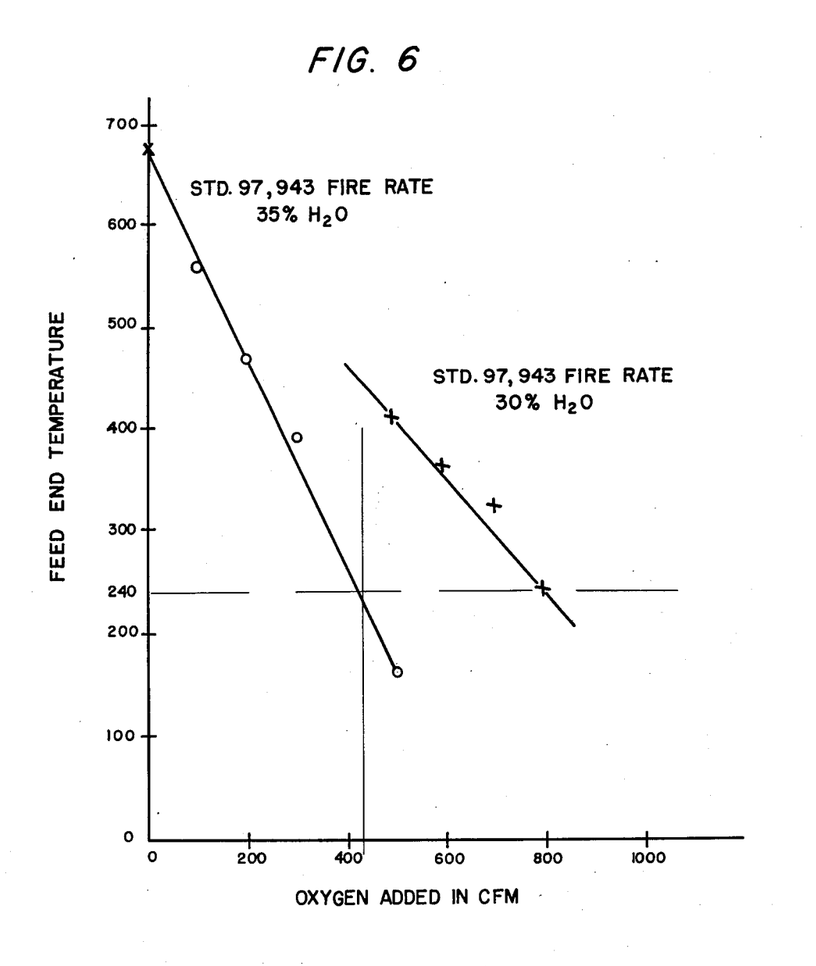
FIG. 6 is a curve of feed end temperature vs. oxygen addition.
Figure 7:
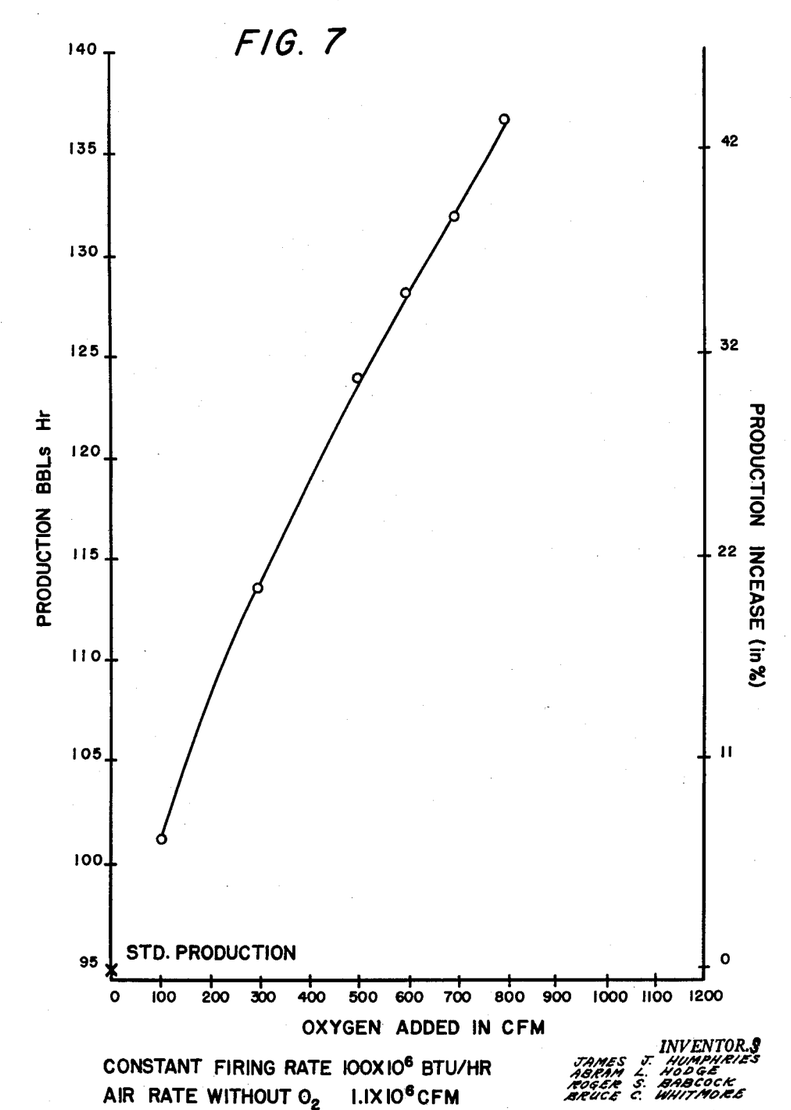
FIG. 7 illustrates the increase in production with oxygen additions according to the invention.

The addition of oxygen is limited. As illustrated by the data in FIG. 6, the temperature of the exhaust gas is about 560° F. at the raw material feed end of the kiln at an oxygen flow rate of 6000 c.f.h. (100 c.f.m.). Also as illustrated in FIG. 6, with increased oxygen flow rates the exhaust gas temperature decreases. The minimum exhaust gas temperature that can be tolerated must be high enough so that the gases passing through associated gas cleaning equipment will not fall below the dewpoint of the gases in the equipment. In the foregoing discussion this temperature is assumed to be about 240° F. Referring to FIG. 7, the data summarized by the curve indicates that the production increase realized, with oxygen added at the rate of 6000 c.f.h. (100 c.f.m.) is about 7 bbl.'s and that as the oxygen flow rate is increased, production is increased. The limitation of lack of heat in the exhaust gas end of the kiln is a new problem in cement making. Heretofore there was always an excess of lower grade energy. The shift in energy caused by oxygen additions reduces the heat available at the exhaust gas end of the kiln. If steps are taken to reduce the moisture in the slurry and thus reduce the moisture condensation problem, still greater production increases will be realized with increased oxygen additions. Referring again to FIG. 6, it will be noticed that if the moisture content of the slurry is reduced to 30%, 800 c.f.m. of oxygen may be added to the flame without decreasing the temperature below 240° F. Using the data in FIG. 7, it is noted that at 800 c.f.m. production is increased by about 30 bbl.'s. Other possible solutions to the problem of decreased exhaust gas temperature with increased oxygen flow rates are to provide a heater at the back end to keep the temperature of gases leaving the kiln above the minimum value; to insulate the back end of the kiln; or to design a new, shorter kiln.

When oxygen is added to a kiln-cooler unit (FIG. 1) high temperature heat is increased in two ways. Consider an example wherein a kiln is burning 100 units of fuel and the exhaust gas is at a temperature of 1000° F. and the air necessary for combustion is preheated in the cooler to a temperature of 500° F. In this hypothetical case, add 10 units of oxygen to the combustion zone. High temperature energy will increase and the exhaust gas temperature will decrease as discussed above. In such case more high temperature energy is available. The feed rate of raw materials to the kiln is increased to absorb the increased energy. This provides additional hot product to the cooler which in turn will add more heat to the air coming in to be preheated so that the combustion air is now some temperature, 500° F.+. Also with the addition of 10 units of oxygen, combustion air may be cut by 50 units. With less air to be heated to flame temperature, the combustion air will be heated again to some temperature 500° F.++. As the combustion air temperature increases the flame becomes hotter and the product will become hotter. In order to get maximum utilization of the increased heat exhausted in the product, it is possible to insert waste heat boiler tubes in the cooler of the cement kiln and use the resultant steam to run on oxygen plant compressor. This will greatly reduce the cost of operating the oxygen plant which supplies oxygen to be consumed in the inventive process.

Figure 1:
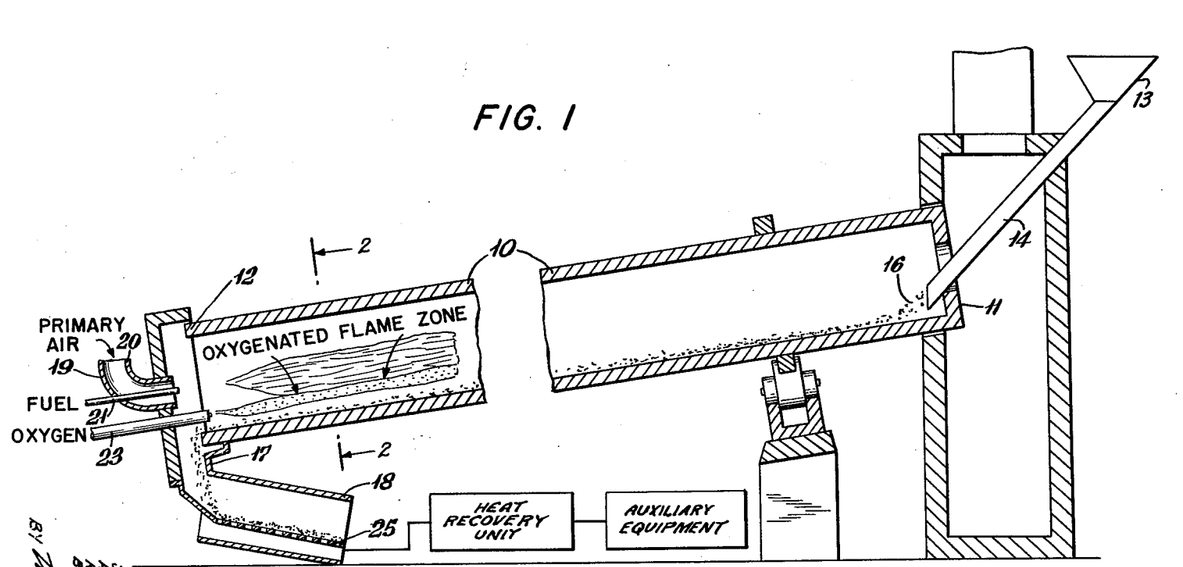
FIG. 1 is a longitudinal section view of a rotary kiln showing the relative position of the flame and oxygen stream therein.

Referring now to FIG. 1, in order to practice the invention, a rotating kiln 10 is provided with a cement-forming raw material feed inlet end 11 and a cement-clinker product discharge end 12. A hopper 13 provided with a chute 14 is mounted near the inlet end 11 and feeds raw material 16 into the kiln 10.

A discharge chute 17 is provided at the discharge end 12 of the kiln 10 to carry the discharged cement-clinker product from the kiln to a cooler or heat exchanger 18.

A burner 19 is mounted at the clinker discharge end 12 and is provided with an air line 20 and a fuel line 21. A non-consumable oxygen lance 23 is mounted at the clinker discharge end 12 below the burner 19 and at a point within the area defined by a line connecting, in a plane transverse to the axis of the kiln 10, the three points which consist of the extremities A and C of the load 16 and the center point of the flame issuing from burner 19 (see FIG. 2). Such lance 23 is capable of longitudinal movement so that the oxygen may be injected at approximately the point of combustion of the combustible mixture discharged from the burner 19.

Secondary air is preheated and supplied to the kiln 10 by passing it through a grating 25 in the cooler 18 and up to the kiln. The energy for preheating the air is supplied by the hot clinker product being discharged into the cooler. The excess energy in the clinker may be then utilized to power auxiliary equipment such as waste heat boiler and the resultant steam utilized to power an oxygen plant compressor.

Figure 2:
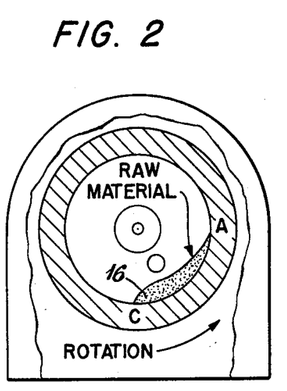
FIG. 2 is a partial broken transverse section of the kiln showing the position of the oxygen stream in this plane.

In operation of manufacture of cement in accordance with method and apparatus of the invention, cement-forming raw materials in the form of a slurry are fed into a rotary kiln by means of a chute connected to the raw materials storage hopper. The feed rate is controlled by a feed controller. An amount of material sufficient to fill only a part of the cross-sectional area of the kiln is added. As the materials are rotated and slid toward the discharge end the material tends to climb the kiln wall as shown in FIG. 2. Also, the temperature of the material is elevated to from about 1450° F. to about 1550° F. in the low temperature zone, which is the zone nearest to the feed inlet end. At this point decomposition of the limestone begins. The temperatures of the calcined materials are further increased in the high temperature zone to a temperature of about 2400° F. to 2800° F. where high grade energy is imparted to the materials to form cement-clinker.

The burner assembly is mounted at the cement-clinker product discharge end of the kiln and directs a stream of hot combustion products countercurrent to the stream of raw materials. The fuel for the burner may be gas, oil or coal. In the case of oil, both primary air and secondary air are utilized. In the case of gas, only secondary air is used. Such air is first passed through the heat exchanger or clinker-cooler where it extracts some of the heat from the discharged product.

An oxygen lance critically positioned between the flame and the raw material load directs a stream of oxygen into the lower portion of the flame approximately at the point of combustion initiation (see FIG. 1). Then the air supplied to the burner is cut back to compensate for the oxygen addition and the rate of feed is increased to absorb the increase in high grade energy caused by the oxygen addition.

Figure 3A:
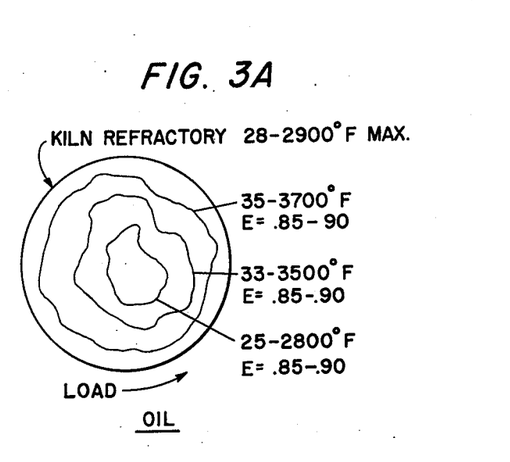
FIGS. 3a, 3b, and 3c are illustrations of thermal gradients respectively, of a normal kiln flame, an ordinary oxygen enriched flame, and of a flame with an oxygenated zone provided according to the invention.

Position of the oxygen stream as noted above is critical. Referring to FIG. 3a, in a standard kiln lined with refractory materials which in most cases can withstand temperatures up to about 2900° F. and fired with an ordinary air-fuel oil flame. The outermost portion of the oil flame has a temperature of from about 3500° F. to 3700° F.

Figure 3B:
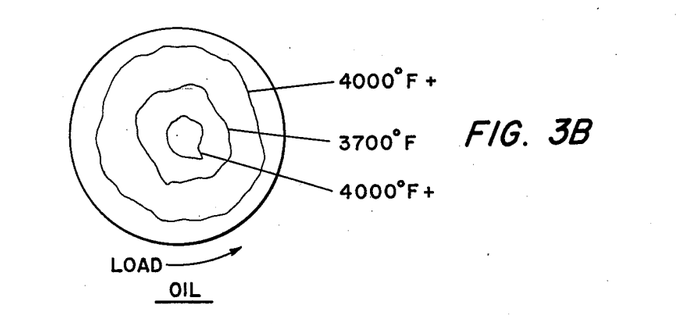
Figure 4:
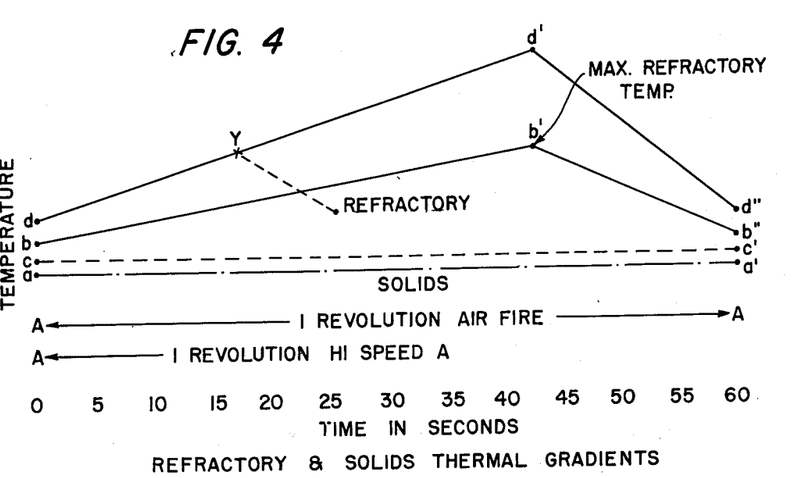
FIG. 4 is a curve of refractory and solid thermal gradients with air firing and with oxygen firing.

If oxygen is added directly into the center of the flame by adding it to primary air, FIG. 3b shows that thermal gradients will be established in the flame. The outermost portions of the flame will increase to about 4000° F. Since the outer flame is much hotter, the rate of temperature input to the refractories will be greater. FIG. 4 shows what can be expected in such a situation. The line a—a' represents the temperature of the solids for one revolution of the kiln, when firing with an ordinary air-fuel flame. With the same fuel rate when oxygen is added to the primary air the line c—c' represents the temperature of the feed solids. In the latter case the radiation component and absorption component energy transfer to the solids will greatly increase. In the case of air firing the refractory as it emerges from the raw material load (point A in FIG. 2 and point B in FIG. 4) is cooler than any other point in the circumference of refractory but is hotter than the load. On rotation, the refractory, being exposed to direct radiation from the flame and convection from the moving combustion gases will reach a maximum temperature just before being covered by the load (point C in FIG. 2 and B' in FIG. 4). The refractory gives up heat to the feed solids and cools back to temperature B" at point A.

The curve d—d'—d" represents the same cycle for a kiln being fired with an oxygen enriched flame. In this case the refractory material reaches the maximum temperature B' at a point Y. To prevent damage to the refractory materials they must again be covered by the feed-solids. In order to do this, the rotational speed must be increased, perhaps by as much as 2 to 3 times.

Figure 3C:
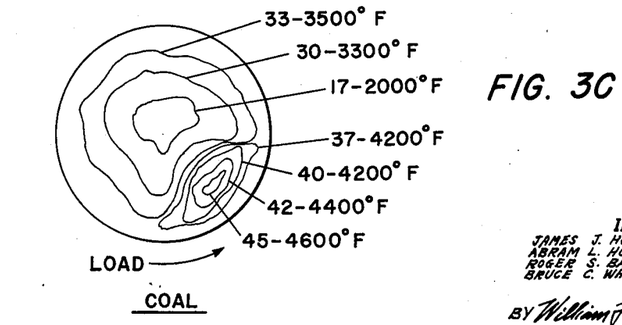
Figure 5:
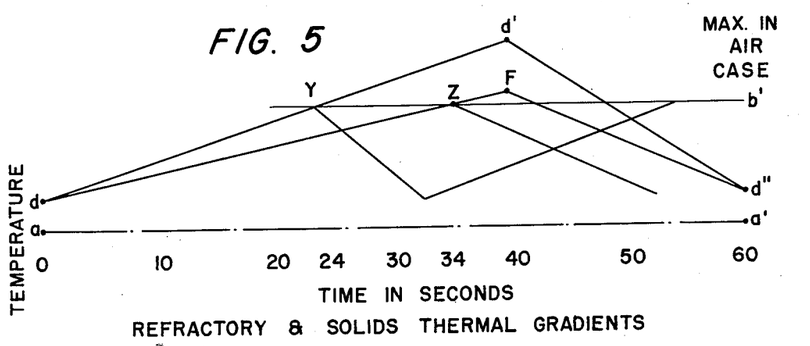
FIG. 5 is a curve showing relationship of kiln rotation to temperature for firing a furnace according to the invention and for ordinary oxygen firing.

FIGS. 3c and 5 show the beneficial results obtained when oxygen is added according to the method of the invention. FIG. 3c clearly indicates how the high emissivity flame and the load will shield the refractory from the "hot spot" created by the addition of oxygen. FIG. 5 compares the inventive method of adding oxygen to a haphazard addition of oxygen and the offset each has on rotational speed. In this latter figure line a—a' represents an increased load solids temperature. The curve d—d'—d" is the same as in FIG. 4. The curve d—f—d" represents the temperature curve produced by the inventive method. In the last-named method the maximum refractory temperature b' is reached at point Z. Comparing this to point Y for the curve for random addition of oxygen, it readily can be seen that the increase in rotational speed necessary to protect the refractory in the kiln is substantially reduced by the invention.

Figure 8:
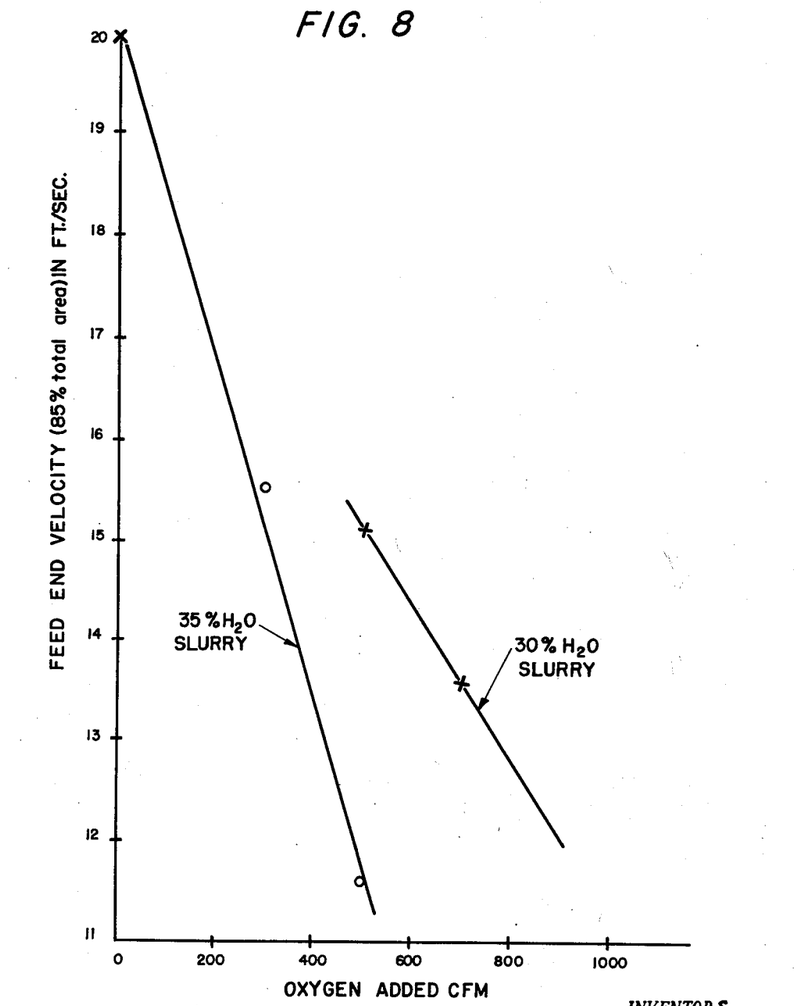
FIG. 8 represents a curve of feed end velocity vs. oxygen enrichment.

Another major advantage of oxygen usage in a cement-making kiln is the reduction of dust loss. Dust loss of a kiln is a function of gas velocity, particle size and feed end turbulence conditions. The actual dust load in the exit gas is a power function of velocity. As shown by the data summarized in FIG. 8, oxygen usage, even with increased production, decreases the feed end velocity. Lower velocities mean lower dust loadings per unit time and thus considerable savings in dust collection equipment.

The above invention has been described in reference to manufacture of cement, such description necessarily contains limitations which in no way should be construed as limitations to the inventive concept contained herein except as defined and limited in the appended claims.

What is claimed is:

1. A method for the manufacture of cement in a rotary kiln having an inlet end and a discharge end, which comprises charging cement-forming raw materials to the inlet end of said rotary kiln, injecting a combustible mixture from a burner disposed above the surface of the cement-forming raw materials into said kiln from the discharge end thereof, igniting said mixture to provide a flame in said kiln, establishing a high grade energy zone at a temperature of about at least 1450° F. wherein high grade energy is supplied to said raw materials, and a low grade energy zone at a temperature of below at least 1450° F. wherein low grade energy is supplied to said raw materials, supplying an oxygen stream to said kiln from said discharge end initially directly between the burner and the raw material load in a direction substantially parallel to the axis of rotation of the kiln to cause an increase in the high grade energy and a decrease in the low grade energy while keeping the total energy available to said raw materials substantially constant and controlling said feed rate of such cement-forming raw materials to said rotary kiln to absorb the increase of high grade energy such that a condition of substantial thermal balance is established in said rotary kiln whereby a substantial increase in production and reduction in fuel consumption and dust per barrel of cement produced is realized.

2. A method for the manufacture of cement in a rotary kiln having an inlet end and a discharge end which comprises charging cement-forming raw materials to the inlet end of said rotary kiln, injecting a combustible mixture from a burner disposed above the surface of the cement-forming raw materials into said kiln from the discharge end thereof, igniting said mixture to provide a flame in said kiln, establishing a high grade energy zone at a temperature of about at least 1450° F. wherein high grade energy is supplied to said raw materials and a low grade energy zone at a temperature of below at least 1450° F. wherein low grade energy is supplied to said raw materials, supplying an oxygen stream to said kiln from said discharge end initially directly between the burner and the raw material load in a direction substantially parallel to the axis of rotation of the kiln, on a line drawn from the center of such flame to the center of mass of such raw materials in said rotary kiln, to cause an increase in the high grade energy and a decrease in the low grade energy while keeping the total energy available substantially constant to said raw materials, and controlling said feed rate of such cement-forming raw materials to said rotary kiln to absorb the increase of high grade energy such that a condition of substantial thermal balance is established in said rotary kiln, whereby a substantial increase in production, and reduction in fuel consumption and dust per barrel of cement produced is realized.

3. A method for the manufacture of cement in a rotary kiln having an inlet end and a discharge end which comprises charging cement-forming raw materials to the feed inlet end of said rotary kiln, establishing an air-fuel flame from a burner disposed above the surface of the cement-forming raw materials at the discharge end of said kiln, directing such flame longitudinally into said kiln from adjacent the discharge end thereof to supply energy needed to cause chemical and mechanical changes in said cement-forming raw materials, discharging exhaust gas from the feed inlet end of said kiln, supplying an oxygen stream to said kiln from such discharge end initially directly between said air-fuel flame and the raw material in a direction substantially parallel to the axis of rotation of the kiln, and controlling said feed rate of such cement-forming raw materials to said rotary kiln to absorb the energy provided by the addition of such oxygen stream to such air-fuel flame to restore a condition of substantial thermal balance in said kiln, thereby substantially increasing production, and reducing fuel consumption per barrel of cement produced and the dust per unit of cement produced.

4. A method for the manufacture of Portland cement in an inclined rotary kiln having an inlet end and a discharge end which comprises charging cement-forming raw materials containing calcareous and argillaceous materials to the feed inlet of said inclined rotary kiln, establishing an air-fuel flame from a burner disposed above the surface of the cement-forming raw materials at the discharge end of said rotary kiln, directing such flame longitudinally into such kiln from adjacent said feed discharge end thereof to supply energy needed to calcine said calcareous materials and to further heat such calcined materials and said argillaceous materials to a temperature in the range of from about 2400° F. to about 2800° F. to form Portland cement clinker, discharging exhaust gas from the feed inlet end of said rotary kiln, supplying an oxygen stream to said kiln from adjacent the discharge end thereof, initially directly between said air-fuel flame and said cement-forming raw materials in a direction substantially parallel to the axis of rotation of said kiln, and controlling said feed rate of such cement-forming raw materials to said rotary kiln to absorb the energy provided by the addition of such oxygen stream to such air-fuel flame to restore a condition of substantial thermal balance in said kiln, thereby substantially increasing production, and reducing fuel consumption per barrel of cement produced and the dust per unit of cement produced.

5. A method for the manufacture of Portland cement in an inclined rotary kiln having an inlet end and a discharge end which comprises charging cement-forming raw materials containing calcareous and argillaceous materials to the feed inlet of said inclined rotary kiln, establishing an air-fuel flame from a burner disposed above the surface of the cement-forming raw materials at the discharge end of said rotary kiln, directing such flame longitudinally into such kiln from adjacent said feed discharge end thereof to supply energy needed to calcine said calcareous materials and to further heat such calcined materials and said argillaceous materials to a temperture in the range of from about 2400° F. to about 2800° F. to form Portland cement clinker, discharging exhaust gas from the feed inlet end of said rotary kiln, supplying an oxygen stream to said kiln from adjacent the discharge end thereof, initially directly between said air-fuel flame and said cement-forming raw materials in a direction substantially parallel to the axis of rotation of the kiln, reducing the quantity of air delivered to said air-fuel flame to control oxygen in said exhaust gas, and controlling said feed rate of such cement-forming raw materials to said rotary kiln to absorb the energy provided by the addition of such oxygen stream to such air-fuel flame to restore a condition of substantial thermal balance in said kiln thereby substantially increasing production, and reducing fuel consumption per barrel of cement produced and the dust per unit of cement produced.

6. A method for the manufacture of Portland cement in an inclined rotary kiln having an inlet end and a discharge end which comprises charging cement-forming raw materials containing calcareous and argillaceous materials to the feed inlet of said inclined rotary kiln, establishing an air-fuel flame from a burner disposed above the surface of the cement-forming raw materials at the discharge end of said rotary kiln, directing such flame longitudinally into such kiln from adjacent said feed discharge end thereof to supply energy needed to calcine said calcareous materials and to further heat such calcined materials and said argillaceous materials to a temperature in the range of from about 2400° F. to about 2800° F. to form Portland cement clinker, discharging exhaust gas from the feed inlet end of said rotary kiln, supplying an oxygen stream to said kiln from adjacent the discharge end thereof, initially directly between said air-fuel flame and said cement-forming raw materials in a direction substantially parallel to the axis of rotation of said kiln, causing such oxygen stream to impinge the air-fuel flame at substantially the point of ignition thereof to increase the flame temperature in the vicinity of said oxygen and resulting in increased energy available to such Portland cement-forming raw materials, and controlling said feed rate of such cement-forming raw materials to said rotary kiln to absorb the energy provided by the addition of such oxygen stream to such air-fuel flame to restore a condition of substantial thermal balance in said kiln thereby substantially increasing production, and reducing fuel consumption per barrel of cement produced and the dust per unit of cement produced.

7. A method for the manufacture of Portland cement in an inclined rotary kiln having an inlet end and a discharge end which comprises charging cement-forming raw materials containing calcareous and argillaceous materials to the feed inlet of said inclined rotary kiln, establishing an air-fuel flame from a burner disposed above the surface of the cement-forming raw materials at the discharge end of said rotary kiln, directing such flame longitudinally into such kiln from adjacent said feed discharge end thereof to supply energy needed to calcine said calcareous materials and to further heat such calcined materials and said argillaceous materials to a temperature in the range of from about 2400° F. to about 2800° F. to form Portland cement clinker, discharging exhaust gas from the feed inlet end of said rotary kiln, supplying an oxygen stream to said kiln from adjacent the discharge end thereof, beneath the burner in a direction substantially parallel to the axis of rotation of the kiln and between said air-fuel flame and said cement-forming raw materials, causing such oxygen stream to impinge the air-fuel flame at substantially the point of ignition thereof thereby increasing the flame temperature in the vicinity of said oxygen and resulting in increased energy available to such Portland cement-forming raw materials, reducing the quantity of air delivered to said air-fuel flame to maintain at least about 1.1% oxygen in said exhaust gas, and controlling said feed rate of such cement-forming raw materials to said rotary kiln to absorb the energy provided by the addition of such oxygen stream to such air-fuel flame to restore a condition of substantial thermal balance in said kiln thereby substantially increasing production, and reducing fuel consumption per barrel of cement produced and the dust per unit of cement produced.

8. Method for the manufacture of Portland cement in a rotary kiln having an inlet end and a discharge end which comprises charging cement-forming material into the inlet end of the kiln, establishing a flame at the discharge end of the kiln from a burner disposed above the surface of the cement-forming materials therein, supplying an oxygen stream to said kiln from the discharge end initially directly between the burner and the cement forming materials in a direction substantially parallel to the axis of the kiln.

References Cited in the file of this patent

UNITED STATES PATENTS

| | | |
|---|---|---|
| 797,506 | Eldred | Aug. 15, 1905 |
| 1,912,811 | Wechter | June 6, 1933 |
| 2,556,542 | Hollingsworth | June 12, 1951 |
| 2,820,348 | Sauter | Jan. 21, 1958 |